United States Patent [19]

Sylten

[11] 3,970,938
[45] July 20, 1976

[54] METHOD AND APPARATUS FOR DETERMINING MOTION AND SPEED

[75] Inventor: Hans D. Sylten, Fort Lauderdale, Fla.

[73] Assignee: Jack N. Holcomb, Fort Lauderdale, Fla.

[22] Filed: June 24, 1974

[21] Appl. No.: 482,481

[52] U.S. Cl. .................................. 325/117; 325/160
[51] Int. Cl.² ......................................... G01R 33/00
[58] Field of Search ............. 325/117, 160; 331/23; 332/18, 37 D

[56] References Cited
UNITED STATES PATENTS

| | | | |
|---|---|---|---|
| 2,198,025 | 4/1940 | Davies et al. | 325/160 |
| 2,539,476 | 1/1951 | Rines | 325/160 |
| 2,539,477 | 1/1951 | Rines | 325/160 |
| 3,123,801 | 3/1964 | Bosler | 325/117 |
| 3,497,808 | 2/1970 | Goodman et al. | 325/117 |
| 3,559,107 | 1/1971 | Morgan et al. | 332/37 D |
| 3,835,419 | 9/1974 | Milne et al. | 332/18 |

Primary Examiner—Maynard R. Wilbur
Assistant Examiner—T. M. Blum
Attorney, Agent, or Firm—Herbert C. Schulze

[57] ABSTRACT

This is a method, and apparatus for practicing such method, wherein motion of an object may be detected remotely and relative speed of the object may be detected wherein a transmitter having an antenna is attached to the object and changes in the collector current, due to changes in the impedance of the antenna, resulting from changing conditions of the object such as motion and speed, are detected, remotely, so as to indicate conditions of rest, motion, and speed of the object and wherein the change of the impedance, and collector current resulting therefrom, are functions of the motion and/or speed of the object.

6 Claims, 5 Drawing Figures

METHOD AND APPARATUS FOR DETERMINING MOTION AND SPEED

BACKGROUND OF THE INVENTION

1. FIELD OF THE INVENTION

This invention is in the general field of detecting motion and speed of objects under surveillance, when such objects cannot be observed visually and are at a distance from the point of surveillance.

This invention is more particularly directed to the detection of the motion and speed of an automotive vehicle, or other vehicle, under surveillance, wherein a transmitter may be connected to such vehicle.

2. DESCRIPTION OF THE PRIOR ART

There are various means for detecting motion of objects. Under proper circumstances, radar and the like may be utilized to detect the speed of objects or the motion of such objects.

Visual observation can, of course, likewise be used for this purpose.

There are many circumstances, in which radar and the like are ineffective, or unuseable, and, in any event, complex and expensive.

There are some radio devices such as direction finders or the like, when utilized in pairs, which can detect the motion of an object to which a transmitter is attached and by appropriate triangulation the actual speed may sometimes be calculated.

All of the past known methods and apparatus for the determination of speed and motion (except visual observation) are complex and require coordination and expense, as is clear to those skilled in the art.

I have devised a method, and an apparatus for practicing such method, wherein we monitor, in an economical manner, and by a single operator, the motion and speed of an object to which a transmitter is attached. I accomplish this by detecting, remotely, the impedance, and changes thereof, in an antenna attached to such transmitter. It has been known in the past that such conditions as birds perching upon an antenna, and other such disturbances cause changes in the antenna impedance; however, this has always been merely a "problem" which has been the subject of research for the purpose of attempting to eliminate the changes. There is no prior art suggesting or utilizing the impedance changes of antennas for the unique and constructive purpose herein.

SUMMARY OF THE INVENTION

Moving surveillance systems, as is known to those skilled in the art, are used to fulfill an important goal for law enforcement personnel, enabling such personnel to maintain surveillance over subjects. The knowledge of movement, or lack thereof, during such times, particularly while such subjects are utilizing automotive vehicles for transport, is critical.

A typical surveillance system of this nature employs a miniature radio transmitter attached to a vehicle by means of magnets of clamps, or the like. Another vehicle (being utilized by the surveillance officers) equipped with a radio receiver, capable or receiving the signal from the transmitter, and typically a direction finding receiver, will be used for this purpose. The transmitters generally operate in the high-frequency and very high-frequency ranges and emit short duration radio frequency impulses; the use of the transmission impulses is primarily to enable the transmitter, which is generally powered by a battery, to have maximum life.

While the transmitters and receivers used until now, and well known in the art, have been quite reliable for determining the direction of a vehicle being followed, the surveillance personnel cannot, however, determine whether the vehicle is in motion or standing still, except during those intervals when a change of direction indicates movement, or when in sight.

I have studied this problem, and have developed in this invention, a method and apparatus by which motion of a vehicle being under surveillance is detected by means of the detection of changes in antenna impedance resulting from physical displacement of the antenna from a calibrated position.

It is known that birds perching upon an antenna, high winds, objects striking an antenna, and the like, create sufficient disturbances so as to affect the antenna impedance and the collector current as a function thereof. For many years, it has been a particular problem for persons in the radio transmission field to attempt to cope with the difficulties of transmission resulting from antenna disturbances. Until I conceived the present invention, it has been felt that this was only a very adverse situation for which a cure has been sought. I have now turned this from the "problem" area and I have made it work to our advantage in solving, economically, the problem of detecting motion and speed of a vehicle under surveillance.

The collector current of a transistorized radio frequency power amplifier is a function of the radio frequency drive level applied to the input terminal of such power amplifier. And, thus, it is a function of the load impedance presented to the collector terminal of such power amplifier.

The radio frequency load impedance, seen by the transistor, is a function of the desired radio frequency power output level. The actual loading of the transmitter is provided by the antenna and in some cases by the antenna and a transmission line.

In most cases, the impedance of the transmitter load is standardized at approximately 52 ohms, which is the equivalent of the characteristic impedance of coaxial transmission lines used for this purpose.

The tracking transmitter antenna as utilized in this invention is attached directly to the transmitter output terminal without employing a transmission line. When the impedance of the antenna changes, the transformed impedance of the antenna appearing on the collector terminal of the power amplifier will change. Since the transformed load impedance appearing across the collector terminals of the power amplifier determines the collector current to a great extent, the change in such transformed load impedance will, also, cause a change of the collector current.

The antenna for the tracking transmitter is normally constructed from highly resilient copper-clad steel wire containing, at its center, a loading inductor which, in conjunction with the normal environment in which it is placed, generates an antenna impedance close to 50 ohms. When the vehicle to which the tracking transmitter is attached is stationary, the antenna impedance will not undergo change. When the vehicle moves, vibration, as well as wind resistance or the antenna, will cause a deflection of the antenna from its normal attitude which will further cause the antenna impedance to change drastically. This change in antenna impedance is transformed into a change of load impedance seen by the radio frequency power amplifier and causes a change in the collector current of this amplifier.

The change of collector current is monitored by a direct current sensing amplifier, the output of which is connected to a voltage controlled oscillator. The frequency of the voltage controlled oscillator becomes a function of the collector current of the radio frequency power amplifier and the output of the voltage controlled oscillator modulates the transmitter in various functions thereof as follows: Frequency modulation; pulse width modulation; pulse code modulation; pulse repetition rate modulation; and the like.

The foregoing changes are transmitted to the receiver in the following or tracking vehicle, which receiver is equipped with appropriate circuitry to extract a tone change of a frequency modulated tracking signal or the changes in the other modulation variables as indicated.

Visual or aural detection of the changes by the operator of the surveillance vehicle enables such operator to determine the status of the vehicle being followed.

Utilizing the frequency modulation principle, normally there will first be a calibration of the transmitter with its antenna when attached to a vehicle which is standing still and without the engine running. At this calibration, or reference, point there will be a stable situation in which there will be a single tone or single frequency which will be the standard. When the engine of the vehicle is started, there will be a variation, but the variation will be within relatively narrow limits about the particular calibration point, or standard. There will be, in other words, some instability or "wobbling" about that particular frequency. As the vehicle travels at increased speed, there will be variations constantly about the frequency so that by establishment of a new frequency at a given speed, a relationship can be established which will show approximate speed, although there will always be a bit of instability or wobbling of the tone at all times when the vehicle is in motion.

In addition to the general motion, further factors will be discovered. For example the passage of a large vehicle (such as a large truck or the like), or the passage by certain buildings, or the like will cause momentary turbulence and in turn will cause a different tone or different frequency as the case may be. Thus, if various frequencies for various velocities have been established, and there is a sudden momentary change it would be possible to surmise the passing of a particular object or the like.

It will be seen that by full correlation of the effect observed, additional information may be obtained by the surveillance personnel, the cause of various changes of a certain nature and duration can be determined empirically.

It is basically the angular displacement, or attitude, of the antenna which is the determining factor providing the effect being detected in the method of this invention. In order to amplify such effect, it is deemed desirable to provide the antenna with an appropriate fin, or the like, so that wind resistance will cause an exaggerated movement in order to amplify the condition for detection.

In general the actual attitude of the vehicle will make little difference to the operation of this method for determining motion. For example; upgrades, downgrades, and the like will have no effect, or the effect will be so minute as to be unimportant, since the normal condition of the environment will remain basically the same under most conditions. In the event the vehicle would overturn or undergo such a change that its relationship to the road was essentially destroyed momentarily, or permanently, and thus its environment destroyed, there would be a different characteristic. Among other things, such violent change, if it should occur, would undoubtedly indicate an accident or other occurrence which would give additional information to the surveillance officers.

It is an object of this invention to provide a method and apparatus for indicating motion of an object not within visual observation.

It is another object of this invention to provide a method and apparatus for determining whether a vehicle under surveillance is moving or stationary.

Another object of this invention is to provide such a method and apparatus as above described in which the antenna of a tracking transmitter-receiver arrangement is subjected to changes of attitude in which the impedance thereof changes as a function of the status of such vehicle.

Another object of this invention is to provide a method and apparatus as above described in which the character of the signal being transmitted by a tracking transmitter is altered due to a change in impedance of the antenna and the collector current resulting therefrom.

Another object of this invention is to provide such an arrangement as heretofore described, wherein surveillance personnel may monitor the changing conditions of a vehicle under surveillance.

The foregoing and other objects and advantages will be clear to those skilled in the art upon reading the following description of a preferred embodiment in conjunction with the appended drawings.

DESCRIPTION OF A PREFERRED EMBODIMENT

Figure 1:
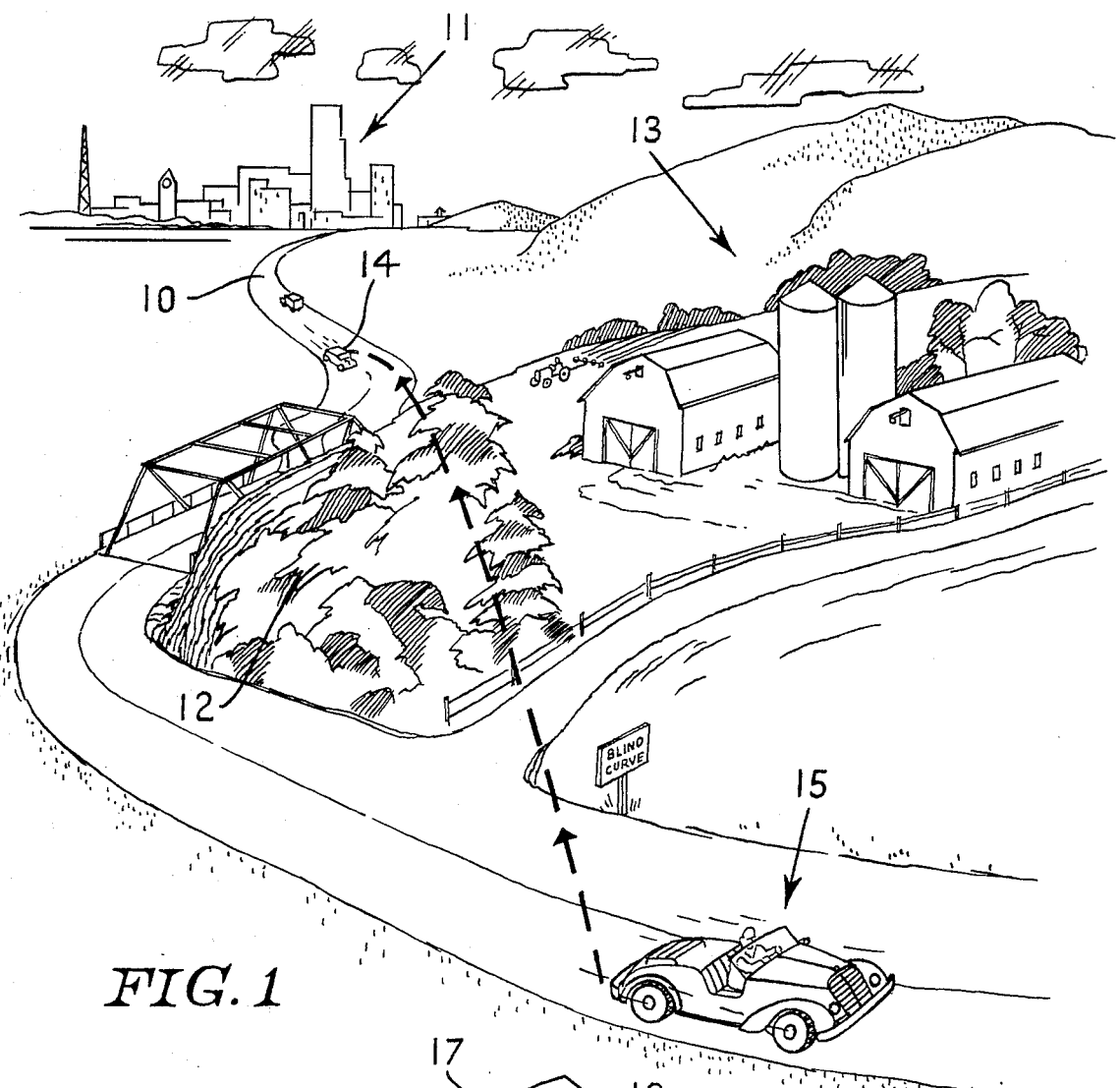
FIG. 1 is a panoramic view of a location in which a vehicle is being tracking by another vehicle wherein the first vehicle is equipped with a hidden transmitter and the second vehicle is equipped with a receiver.

FIG. 1 is a panoramic view of an area through which a highway or the like 10 extends. The highway is leading from a city 11 into a country area and a vehicle being tracked, or under surveillance, is shown travelling away from the city and passing a farm 13, having just rounded a curve wherein a hill 12 completely obstructs the vision of the occupants of the tracking, or surveillance, vehicle 14 equipped with a radio receiver 14a.

In the view shown in FIG. 1, it will be quite clear that the occupants of surveillance vehicle 14 will be unable to observe whether or not the vehicle 15 is moving. Thus, except for the utilization of the method of this invention, while the vehicle 14 is receiving the regular radio signal transmission from vehicle 15, the occupants of the vehicle 14 will be unable to determine whether the vehicle 15 is moving or not. If such occupants of vehicle 14 are unable to determine motion, they could close very quickly upon the vehicle 15. For example, if it stops at the position indicated in FIG. 1, the tracking vehicle might be detected, with possible frustration of the purpose of the surveillance.

Figure 1A:
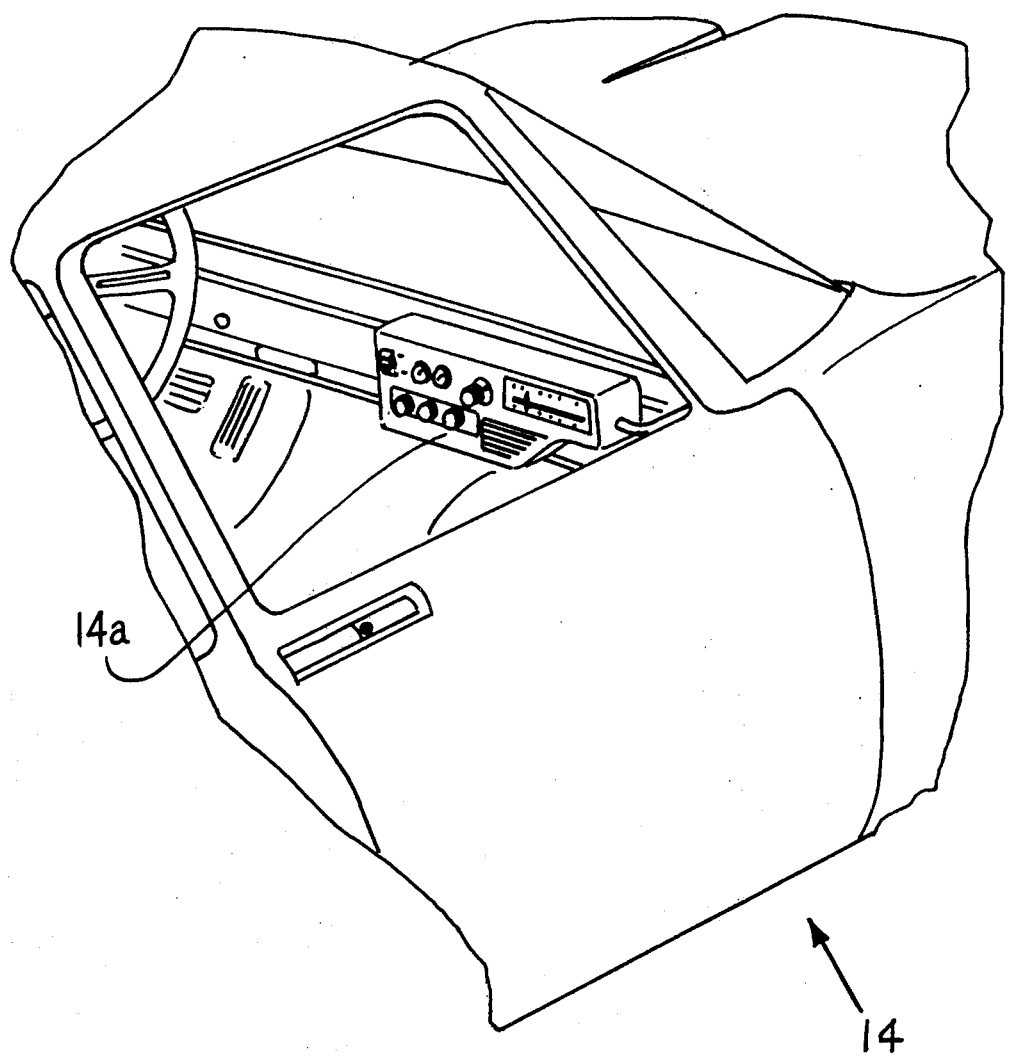
FIG. 1a is an enlarged, partial perspective of a portion of the driver's compartment of vehicle 14.

FIG. 1a shows in more detail the location of a radio 14a within vehicle 14.

If the vehicle 15 should come to a stop, the vehicle 14 could be brought to a stop and could remain so stopped until the vehicle 15 commenced moving again.

Figure 2:
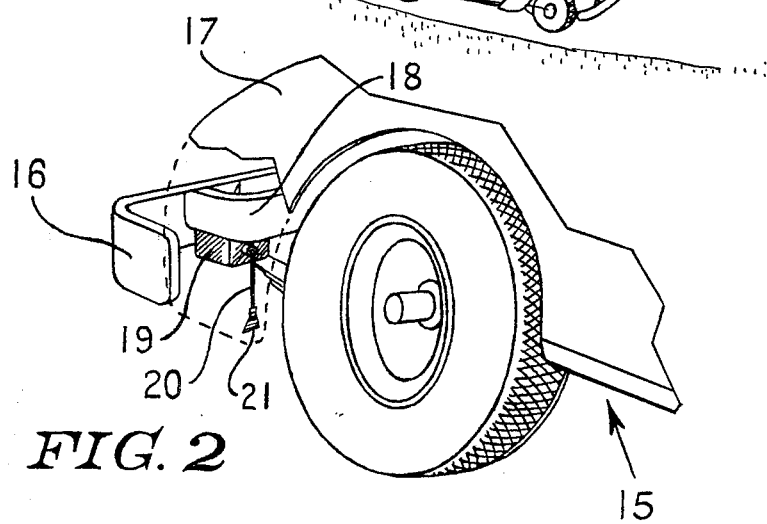
FIG. 2 is an enlarged, partially broken away segment of the vehicle being tracked in FIG. 1 indicating particularly the transmitter and antenna used to transmit signals from the vehicle being tracked.

FIG. 2 shows a limited portion of the right rear of vehicle 15. A fender 17 is illustrated, with a bumper 16 appropriately mounted on frame, or bracket 18, or the like. A transmitter 19 has been fastened by magnets, or the like, in the normally unobservable position as indicated. The transmitter 19 is equipped with an antenna 20, to the end of which has been added a fin 21, preferably in delta shape, as shown, for amplifying the effect of wind resistance and, thus, deflection thereof during movement.

Figure 3:
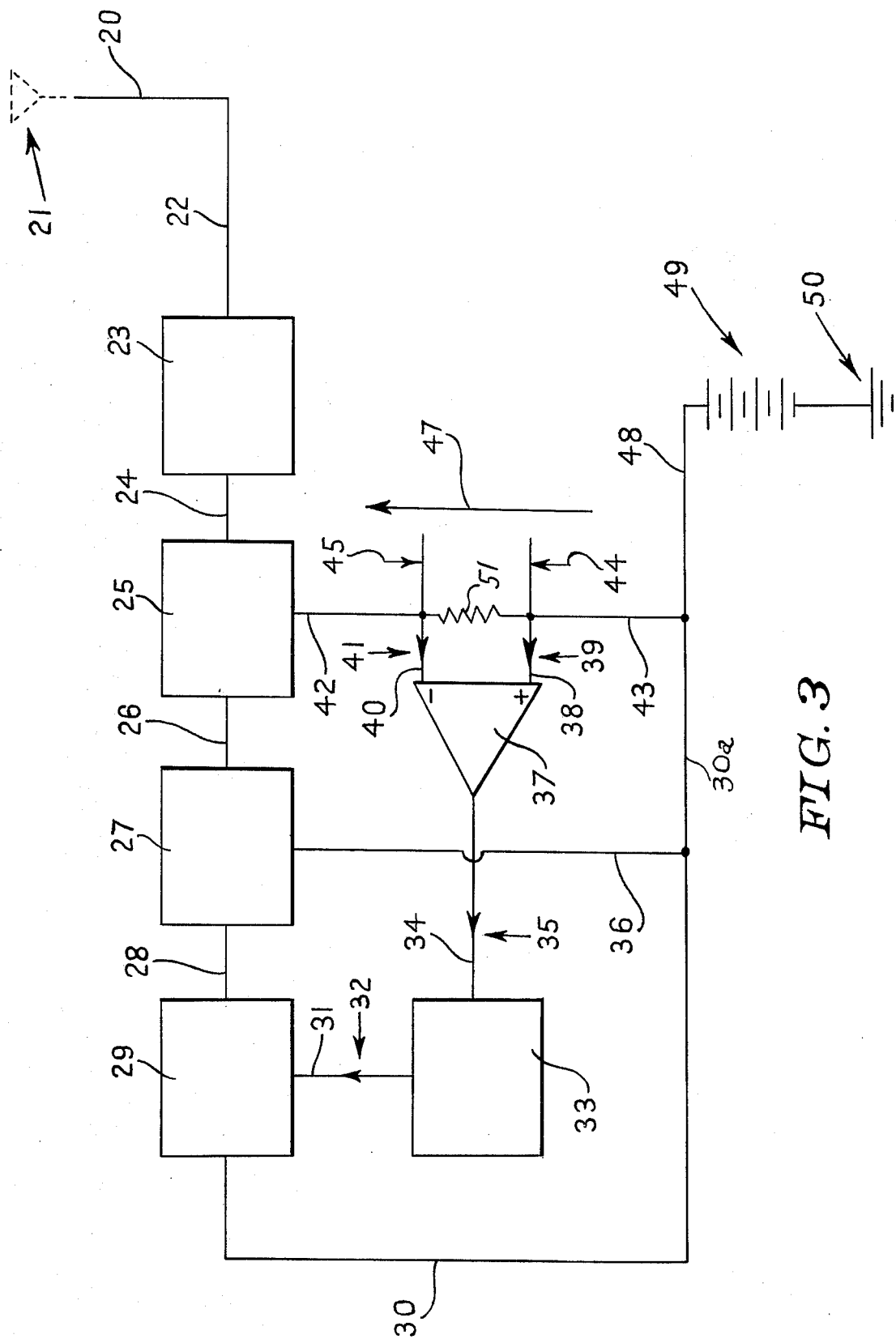
FIG. 3 is a block diagram of an apparatus to practice the method of this invention.

In FIG. 3, the antenna 20 and the fin 21 are indicated merely schematically. The antenna 20 is shown to be connected by appropriate wiring 22 to a matching network 23. This is connected by appropriate wiring 24 to an appropriate power amplifier 25. The power amplifier 25 is connected by appropriate wiring 26 to appropriate multiplier 27, which is connected by appropriate wiring or the like 28 to voltage controlled crystal oscillator 29.

The voltage controlled crystal oscillator is connected by appropriate wiring 30, 30A, and 48 to one terminal of battery 49. This same wiring is also interconnected by wiring 36 to the multiplier 27. By means of appropriate wiring or the like 31, the voltage controlled crystal oscillator is also connected with a voltage controlled oscillator 33, which is connected by wiring 34 to amplifier 37. The positive terminal of the amplifier 37 is connected by wiring 38 to wiring 43 and through wiring 48 to the terminal of battery 49; it is also connected to resistance 51.

The negative terminal of amplifier 37 is appropriately connected by wiring 40 and 42 to the power amplifier 25 and across the resistance 51.

During the periods of time when there is no movement to the vehicle, the impedance of the antenna, and thus the transformed impedance appearing on the collector terminals of the power amplifier remain constant and this becomes the calibrated, no motion, position.

As a change occurs in the transformed impedance of the antenna appearing on the collector terminals of the power amplifier, this will cause a change of the collector current. This change will affect the voltage drop across 44-45, also seen as 39-41.

It is clear that such change of condition, in effect, will be monitored by the direct current sensing amplifier 37, the output of which is connected to the voltage controlled oscillator 33 as previously described. Such output will be transmitted as at 35 along wire 34. This output of the voltage controlled oscillator then feeds into the voltage controlled crystal oscillator 29 as indicated by the directional arrow 32.

It is now clear that the change of the impedance, brought about by the varying of the attitude of the antenna 20 will cause the frequency modulation which will be detectable at the receiver to indicate whether the vehicle is in motion or stationary, and will also indicate radical changes such as passage of certain objects, violent occurrences, such as an accident, passage through water or the like, and similar effects.

It is to be understood that other possible means for the modulation could be pulse width modulation, pulse code modulation, pulse repetition rate modulation, or the like.

The exact method of accomplishing each of these will be possible of achievement by those skilled in the art, having now understood the basic method and basic circuitry involved in this method.

In this description of a preferred embodiment, the details of the various elements have not been shown in connection with the block diagram, since there are many variations known to those skilled in the electronic arts, which variations would be insignificant in the practicing of the invention. the invention is in utilization of an amplification of the changes of attitude of the antenna on a transmitter such as described, and particularly in connection with surveillance vehicles and vehicles under surveillance. The addition of the delta fin to the end of the antenna is deemed an important advance, and this is the first time such a situation has been conceived and utilized for the purposes indicated.

Figure 4:
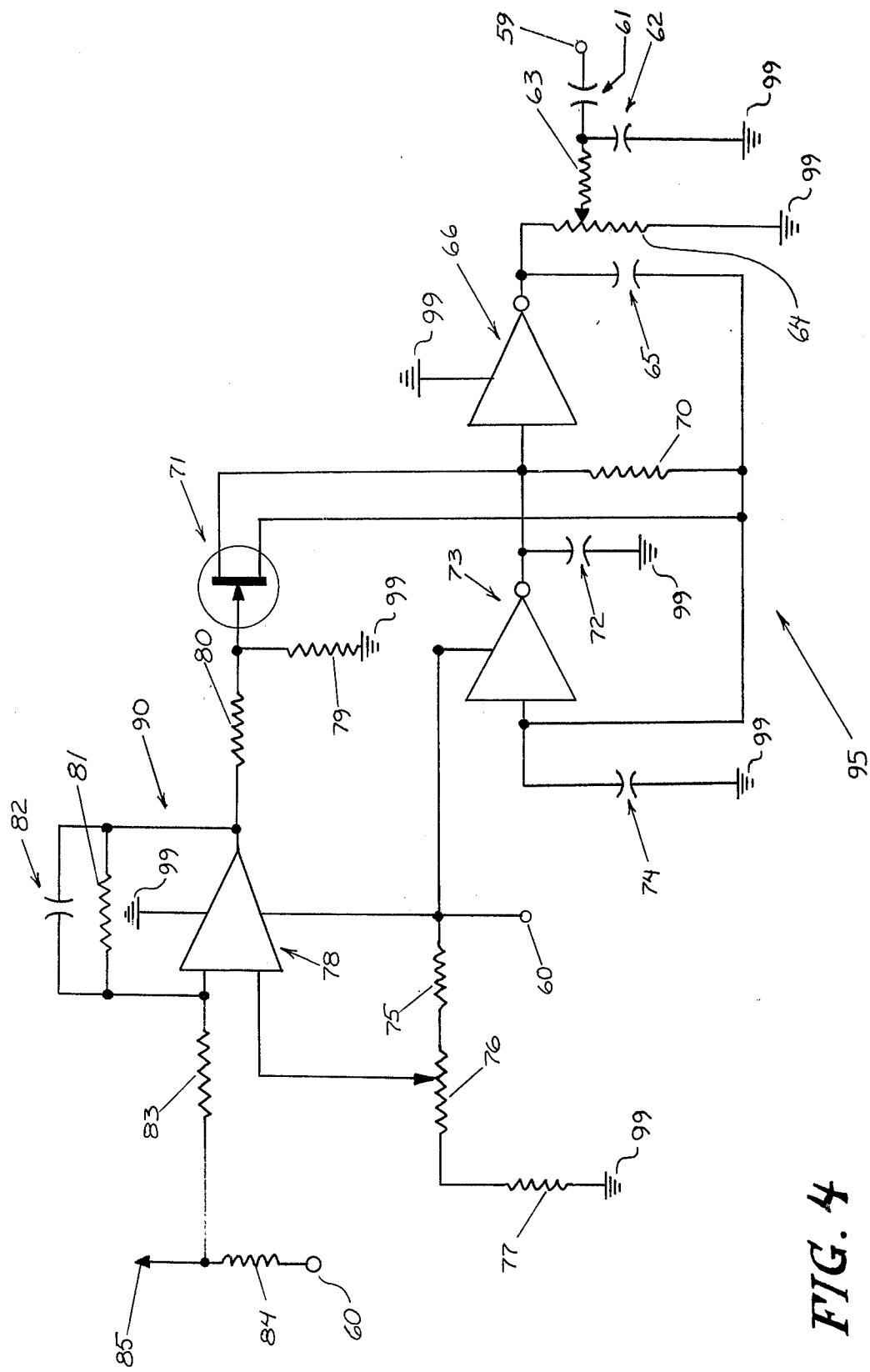
FIG. 4 is a schematic diagram of one actual circuitry to practice the method of this invention.

Turning particular attention to FIG. 4, there is shown one specific circuit which will accomplish the method of this invention. It is not to be deemed in any manner limiting since those skilled in the art may conceive different circuits to accomplish the same end. However, this circuit will set forth a means, at this time the preferred means, of accomplishing this method. At 59, there is shown a connection to crystal controlled modulator, which can be the modulation terminal of any transmitter. This is connected as indicated to a 0.1 micro farad capacitor 61, in turn connected to 39K ohm resistor 63 and 8200 pico farad capacitor 62. In turn capacitor 62 is connected to ground 99.

Deviation control adjustment is by the 100K ohm potentiometer 64. Another ground connection 99 is also indicated. Integrated circuit 66 may be in a CD4049 connected as shown, and the capacitor 65 to which it is connected is a 0.047 micro farad capacitor. Resistor 70 is a 27K ohm resistor. 71 is a junction field effect transistor, e.g. an STF551. 72 is a 1000 pico farad capacitor and integrated circuit 73 may be, for example, integrated circuit such as contained also in the CD4049 Hex Invertor.

Capacitor 74 is a 1000 micro farad and both 74 and 72 are connected to ground as indicated in the drawing. The portion indicated generally 95 comprising the two integrated circuits and the associated circuitry is in effect a voltage controlled oscillator.

The positive pole of the battery or power supply is connected to points designated 60.

A 1K potentiometer 76 is used for oscillator frequency offset adjustment and is connected as indicated to integrated circuit 78 which may be a 741 integrated circuit, and is also connected to ground through a 6.8K resistor 77.

The integrated circuit 78 is also connected to ground as indicated and to 1 megaohm resistor 81 and 1800 pico farad capacitor 82. A mutual connection is also made to 10K resistor 83 which is connected to 2.7 ohm sense resistor 84 and to the voltage controlled capacitor supply point of the transmitter power amplifier, 85.

The portion generally 90 is the sensing amplifier.

While the embodiments of this invention shown and described are fully capable of achieving the object and advantages desired, it will be understood that such embodiments are for purposes of illustration only, and are not for purposes of limitation.

I claim:

1. Apparatus for detecting motion of a transmitter comprising; a transmitter; an antenna connected to such transmitter and depending therefrom; means to sense the load impedance of said antenna; means connected to the transmitter, controlled by said means sensing said load impedance, which means affects a voltage controlled oscillator so as to modulate the transmitter.

2. The apparatus of claim 1 in which the same antenna has affixed thereto a deflector for amplifying the effect of changes in the status of such transmitter and antenna.

3. The device of claim 2 in which said deflector is a delta shaped fin.

4. Apparatus for detecting motion of an automotive vehicle comprising; A radio transmitter attached to the exterior of said vehicle; An antenna attached to said transmitter and depending therefrom; A delta shaped fin attached adjacent the end of said antenna not connected to said transmitter; Means associated with said antenna and transmitter to detect the load impedance of said antenna; Means associated with said transmitter to reflect the load impedance of said antenna as a function of the collector current of a power amplifier of a voltage controlled oscillator; Sensing amplifier means to monitor the collector current connected to said voltage controlled oscillator; Means to modulate the said transmitter as a function of the collector current of the power amplifier; And receiver means to receive and interpret the signals received from said transmitter as the signal is modulated and controlled as a function of the collector current.

5. The method of detecting changes of status of a transmitter including: Inducing a change in the attitude of the transmitter antennae under different conditions of status by attaching to said antennae a deflector which exaggerates the change of attitude of the transmitter antennae under the different conditions of status; (2) detecting the change of impedance of the said antennae resulting from the exaggerated change of attitude (3) varying the modulation of the transmitter output as a function of such change of impedance of the antennae; and, (4) detecting by means of receipt of the signals by an appropriate receiver, the change of modulation of the transmitter as affected by the exaggerated change of antennae status.

6. The method of claim 5 in which the deflector is in the form of a delta shaped fin.

* * * * *